Jan. 2, 1968  A. A. ROTHROCK  3,361,034
LOAD POSITIONING DEVICE

Filed Jan. 28, 1966  2 Sheets-Sheet 1

Arthur A. Rothrock
INVENTOR
BY

Oliver D. Olson
Agent

Jan. 2, 1968     A. A. ROTHROCK     3,361,034
LOAD POSITIONING DEVICE
Filed Jan. 28, 1966     2 Sheets-Sheet 2
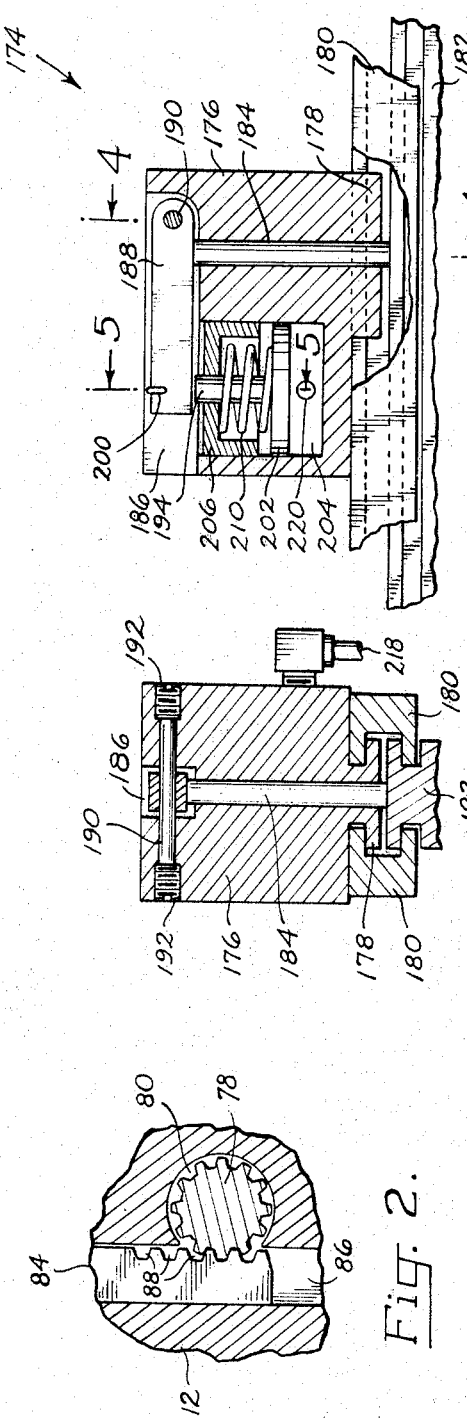
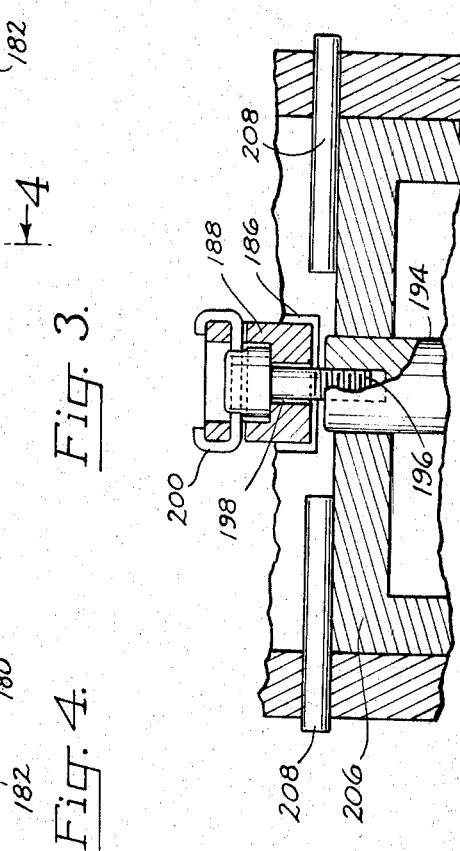
Arthur A. Rothrock
INVENTOR
BY
Agent

# United States Patent Office 3,361,034
Patented Jan. 2, 1968

3,361,034
LOAD POSITIONING DEVICE
Arthur A. Rothrock, 8112 N. Druid Ave.,
Portland, Oreg. 97203
Filed Jan. 28, 1966, Ser. No. 523,708
10 Claims. (Cl. 91—42)

This invention relates to devices for moving a tool or other load selectively to predetermined positions relative to a reference point, and has for its principal objective the provision of such a device which offers the following advantages:

The device may provide a short or long operating range to move a light or heavy load which may resist movement by the device or may tend to induce movement of the device.

The device approaches a predetermined set point always from the same direction, thereby providing maximum precision of setting.

The device provides nearly infinite settings throughout its operating range, with a minimum of mechanical and electrical components.

The device functions automatically to move a load in the desired direction from an initial set point, upon selection of a new set point.

The device affords preselection of a subsequent setting during a preceding setting operation, thereby enhancing the productivity of the load with which the device is used.

The device is of simplified construction for economical manufacture and provides long operating life with a minimum of maintenance and repair.

The foregoing and other objects and advantages of the present invention will appear from the following detailed description, taken in connection with the accompanying drawings in which:

FIG. 2 is a fragmentary sectional view taken on the line 2—2 in FIG. 1;

FIG. 3 is a fragmentary side elevation, partly sectioned, of a locking component which affords preselection of a subsequent setting;

FIG. 4 is a sectional view taken on the line 4—4 in FIG. 3; and

FIG. 5 is a fragmentary sectional view taken on the line 5—5 in FIG. 3.

Figure 1:
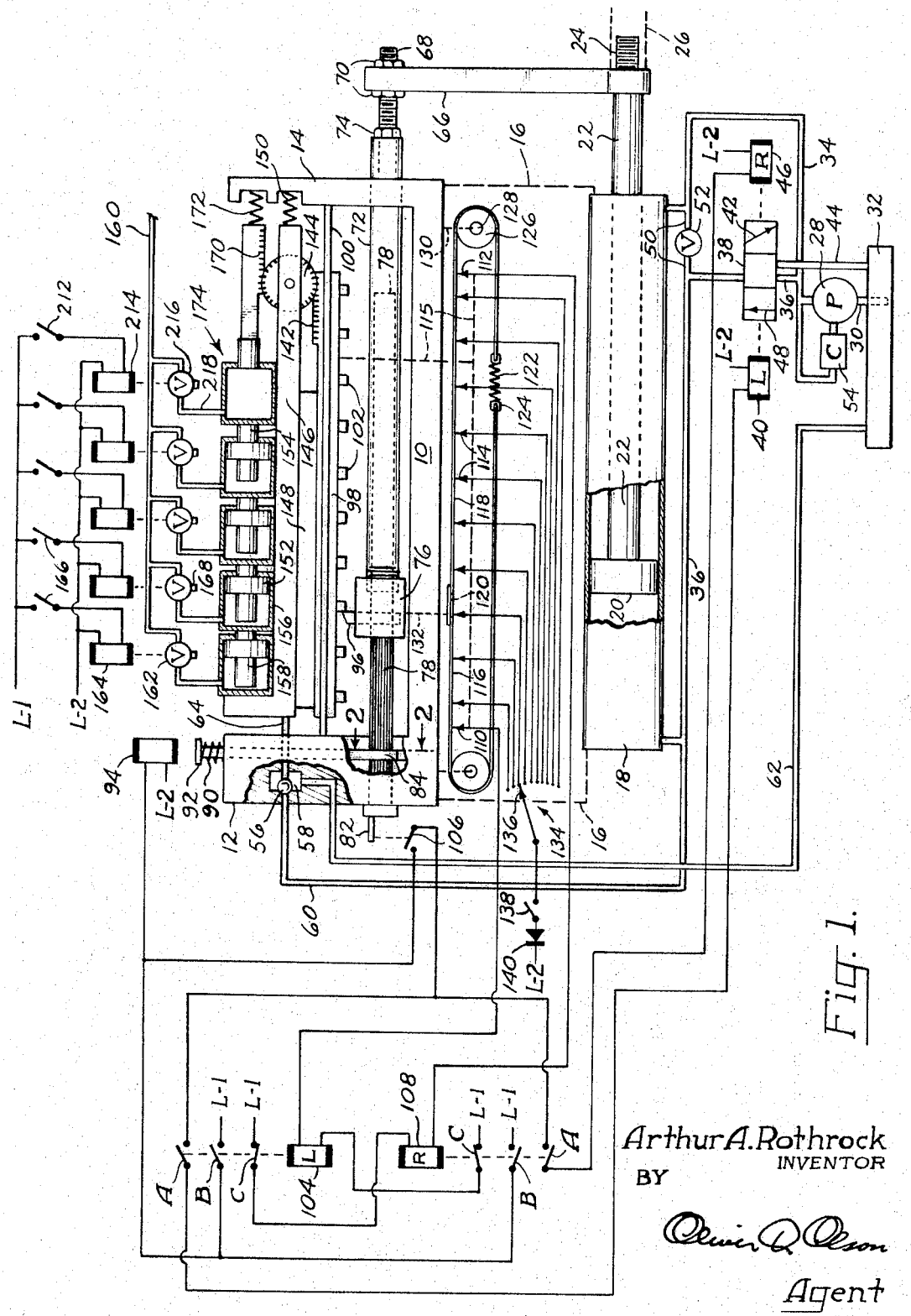
FIG. 1 is a schematic representation of a mechanical and electrical assembly forming a positioning device embodying the features of the present invention, certain mechanical parts thereof being broken away to disclose details of internal construction.

The positioning device of the present invention includes an elongated support 10 provided at its ends with upstanding sections 12 and 14. Secured to the support by attaching means indicated by the dash lines 16, is an elongated cylinder 18 which is closed at both ends. A piston 20 is contained within the cylinder for longitudinal sliding movement, and a piston rod 22 extends from the piston outwardly through one end wall of the cylinder. Suitable sealing means (not shown) is interposed between the piston rod and cylinder wall to provide a fluid pressure seal therebetween.

The projecting outer end of the piston rod is provided with a threaded end section 24 or other suitable means by which to connect the piston rod to a movable tool or other load 26 which is to be positioned. Such a load may be the movable knee or other element of a sawmill carriage, resaw, edger, etc., the working tool of a lathe, grinder, milling machine, etc., or any other of many types of movable loads. The load may be such as to resist movement of the piston rod in either or both directions, or it may be such as to impose a thrust on the piston rod, tending to induce movement of the latter in either or both directions.

The piston rod connects to one side of the piston. The surface area of said side which is to be subjected to fluid pressure thus is reduced in comparison with the surface area of the opposite side of the piston. The relative areas thus provided may be varied as desired, it being assumed for purposes of subsequent explanation that the piston rod side of the piston has an effective area one-half that of the opposite side.

Means is provided for supplying fluid pressure selectively to the opposite sides of the piston. Although such fluid pressure may be compressed air or other gas, it is preferred that it be hydraulic pressure. Accordingly, in the embodiment illustrated, an hydraulic pump 28, driven by an electric motor or other suitable power source (not shown), has its inlet communicating through the conduit 30 with a reservoir 32 of hydraulic fluid. The pump outlet communicates through the conduit 34 directly with the end of the cylinder 18 facing the reduced area end of the piston 20. The pump outlet also communicates through the conduit 36 and the interposed control valve 38 with the opposite end of the cylinder, i.e. the end facing the larger area end of the piston.

As indicated by the arrows associated with the control valve, the pump outlet is sealed from said opposite end of the cylinder when the control valve is in the neutral position illustrated. When the control valve is moved toward the left, by activation of the solenoid 40, said end of the cylinder is connected through the conduit 36 and the valve port indicated by the oblique arrow 42, thence through the exhaust conduit 44 to the hydraulic fluid reservoir 32. When the control valve is moved toward the right, by activation of the solenoid 46, said end of the cylinder is connected through the conduit 36 and the valve port indicated by the vertical arrow 48 to the outlet of the pump.

The opposite ends of the cylinder communicate freely with each other through the bleed conduit 50. This conduit is provided with a constricted intermediate portion indicated in the FIG. 1 by the valve 52. This valve may be a manually adjustable needle valve, or it may simply be a fixed constriction in the conduit. In either case, the bleed conduit functions to permit a relatively slow bleed of hydraulic pressure from the end of the cylinder facing the reduced area end of the piston to the opposite end of the cylinder, for purposes explained more fully hereinafter.

The hydraulic pump may be provided with a conventional pressure compensator 54, as is well known.

Means also is provided for relieving the fluid pressure in the end of the cylinder facing the larger area end of the piston, for purposes explained in detail hereinafter. In the embodiment illustrated, this means is provided by the relief ball valve 56 mounted in an opening 58 in the end section 12 of the support. The ball seat communicates through the conduit 60 with the end of the cylinder facing the larger area end of the piston, and the outlet of the relief valve opening communicates through the conduit 62 with the hydraulic fluid reservoir 32. The ball is movable toward and away from the seat by means of the operating rod 64 which projects slidably through the support section 12 for operation in a manner to be described hereinafter.

Means is provided for controlling the direction and extent of movement of the piston and piston rod, and hence the load, relative to the cylinder, or relative to some other suitable reference point which is fixed with respect to the cylinder. Accordingly, in the embodiment illustrated, one end of an arm 66 is secured to the projecting portion of the piston rod 22. The opposite end of the arm mounts a threaded shaft 68 longitudinally adjustable therein by means of the locking nuts 70. The threaded shaft extends parallel to the piston rod, and the end facing in the direction of the cylinder is threaded adjustably into the adjacent end of the elongated hollow sleeve 72, being secured in adjusted position by means of the lock nut 74. The sleeve extends slidably through an opening in the end section 14 of the support, and the opposite end of the sleeve is connected, by interengaging threads, to a latch block 76.

The adjustments provided by the threaded rod 68 and threaded connection between the sleeve 72 and latch block 76, accommodate initial adjustment of a load 26 to an initial reference point.

The latch block is provided with a longitudinal bore, coaxial with the bore in the sleeve, and these bores freely receive therein an elongated pinion wire 78 which is mounted adjacent its projecting end for reciprocative rotation in an opening 80 (FIG. 2) provided in the support section 12. Bearing means (not shown) secures the pinion wire in said support section against axial displacement.

The projecting end of the pinion wire supports a switch actuating finger 82 which functions in a manner explained in detail hereinafter.

Reciprocative rotation of the pinion wire is effected by means of an elongated drive rack 84 which is mounted freely in an elongated opening 86 in the support section 12. This opening intercepts the longitudinal opening 80 which supports the pinion wire 78, and extends normal thereto to the outer end of the support section. The drive rack is received freely in said opening and is provided at its inner end with a plurality of rack teeth 88 which engage the pinion wire. The opposite end of the drive rack projects from the support section 12. A coil spring 90 encircles this projecting portion of the drive rack, abutting at one end against the support section and at the opposite end against a collar 92 secured to the drive rack. The spring functions to urge the drive rack to its limit of outward extension, as will be apparent. Movement of the drive rack in the opposite direction is effected by the electric latch control solenoid 94.

The latch block 76 is provided with a transverse opening which intercepts the longitudinal bore therein and which slidably receives the lath pin 96. This pin is provided with a plurality of rack teeth which engage the pinion wire. Thus, upon reciprocative rotation of the pinion wire the latch pin is caused to reciprocate relative to the latch block.

A position setting frame member 98 is mounted for movement relative to the support 10 in the direction of movement of the sleeve 72. In the embodiment illustrated, the frame member is mounted slidably on laterally spaced ways 100 supported at their opposite ends on the spaced sections 12, 14 of the support. The frame member mounts a plurality of stop lugs 102 which are spaced apart longitudinally of the frame member and project therefrom for interception by the latch pin 96 when the latter is extended from the latch block. The spacing between stop lugs defines the incremental settings between which the load may be moved.

Electrical control means is associated with the solenoids 40, 46 and 94 for controlling the movement of the load to predetermined positions defined by the stop lugs 102. In the embodiment illustrated, the coil of the valve solenoid 40 is connected in a circuit which extends from terminal L-2 through said coil, thence through the normally open contact A of the relay 104, thence through the safety switch 106, through the normally open contact B of the relay 104 to the other supply terminal L-1. The coil of the other valve solenoid 46 is connected in an electric circuit extending from terminal L-2 through said coil and the normally open contact A of the relay 108, thence through the safety switch 106 and the normally open contact B of the relay 108 to the other supply terminal L-1. The coil of the latch control solenoid 94 is connected in an electric circuit extending from the supply terminal L-2 through said coil and either of the normally open contacts B of the relays 104 and 108 to the other supply terminal L-1.

The purpose of the safety switch 106 is to insure that the latch control solenoid 94 is activated to retract the latch pin 96 (simultaneously closing the safety switch) before either of the valve solenoids 40 and 46 are activated to move the load and latch pin assembly.

Means also is provided for activating one or the other of the relays 104 and 108 automatically to move the load in the desired direction and to a desired new set point. Thus, in the embodiment illustrated, the coil of the relay 104 associated with the valve solenoid 40 which effects movement of the load toward the left, is connected in an electric circuit which extends from the supply terminal L-1 through the normally closed contact C of the other relay 108, thence through the coil of relay 104 to a fixed collector contact 110 of a positioning switch.

Similarly, the coil of the relay 108 associated with the valve solenoid 46 for moving the load toward the right, is connected in an electric circuit which extends from the supply terminal L-1 through the normally closed contact C of the other relay 104, thence through coil of relay 108 to the fixed collector contact 112 of the positioning switch.

It will be apparent that by extending the electric circuit of each relay 104 and 108 through a contact C controlled by the other of said relays, there is achieved the assurance that only one of the relays may be energized at one time.

The positioning switch also includes a plurality of fixed positioning contacts 114 one associated with each of the stop lugs 102. At least the positioning contacts 114, and preferably the collector contacts 110 and 112 as well, are mounted for movement as a unit with the frame member 98 by electrically non-conducting supports indicated by the dash lines 115.

Associated with all of the fixed contacts are a pair of electrically conductive brushes which are arranged for selective engagement with the contacts. In the embodiment illustrated, the pair of brushes are formed of a pair of elongated strips 116 and 118 of flexible, electrically conductive material. One end of these strips are joined together mechanically through the electrically non-conductive spacer element 120, and the opposite ends of said strips are joined together resiliently by the coil spring 122 and the electrically non-conductive tab 124. The two strips thus form a continuous band but are separated electrically from each other. The band is supported between longitudinally spaced, electrically non-conductive rollers 126 which are mounted upon shafts 128 secured to the support 10 by such means as brackets indicated by the dotted lines 130.

Means is provided for moving the continuous band with the latch block 76. In the embodiment illustrated, this is achieved by a connector element indicated by the dotted line 132 which is secured at one end to the latch block and at the opposite end to the electrically non-conductive spacer element 120.

Each of the fixed contacts 114 associated with the stop lugs 102 is connected to a separate terminal of a selector switch 134. The movable brush 136 of this switch is connected through the main control switch 138 and, preferably, the rectifier 140, to the supply terminal L-2.

Means also is provided, in the preferred embodiment illustrated, for controlling the movement of the load 26 to predetermined distances which are but fractions of the distance between adjacent stop lugs 104, in order to achieve nearly infinite settings throughout the range of the device. To this end, the frame member 98 is provided with an elongated rack 142 whose teeth mesh with the teeth on the pinion 144 supported for rotation on the secondary frame member 146. This secondary frame member is supported, as by means of the way 148 projecting from the main frame member 98, for movement relative to the main frame member and to the support 10. One end of the secondary frame member abuts the operating rod 64 of the relief ball valve 56, and the secondary frame member is urged resiliently toward said abutment by means of the coil spring 150 interposed between the opposite end of the secondary frame member and the support section 14.

Supported upon the secondary frame member are a plurality of piston-cylinder units. The piston 152 of each unit carries a piston rod 154 which extends outwardly through one end of the associated cylinder 156 for abutment against the opposite end wall of the cylinder of the next adjacent unit. Each piston also has an internal extension 158 which, when the piston rod is fully extended (the piston being in abutment with the end wall of the cylinder through which the piston rod extends), the end of the piston extension is spaced from the adjacent end wall of the cylinder a distance different from the corresponding spacings of the other units. Thus, for example, assuming the spacing between adjacent stop lugs 102 to be one inch, the spacing between the piston extension and the cylinder end wall of the unit at the left end of the group may be $\frac{1}{16}''$; the next one to the right may be $\frac{1}{8}''$; the next one to the right may be $\frac{1}{4}''$; and the last one at the right end of the group may be $\frac{1}{2}''$. This arrangement of four units thus accommodates fractional settings of the load in $\frac{1}{16}''$ intervals between $1''$ spacings between adjacent stop lugs 102.

One or more additional piston-cylinder units may be provided to extend still further the fractional settings between stop lugs.

The cylinder of the piston-cylinder unit at the left end of the group is secured against movement on the secondary frame member 146 and the remaining units are mounted for movement thereon to effect the fractional settings.

Each piston-cylinder unit is connected to a source 160 of fluid pressure, preferably compressed air, through a valve 162 controlled by a solenoid 164 whose coil is connected across the electric supply terminals L–1 and L–2 through a manual control switch 166. In the embodiment illustrated, each valve connects the cylinder 156 of the associated piston-cylinder unit to the source of fluid pressure when its control solenoid 164 is deenergized, thereby maintaining the piston rod 154 in its position of maximum extension. Upon activation of the solenoid 164 the valve moves to communicate the cylinder 156 with an exhaust outlet 168, to allow the piston 152 to move in the direction to retract its piston rod 154 to the extent permitted by the spacing between the piston extension 158 and the adjacent end wall of the cylinder.

It will be understood that in the event the source 160 of fluid pressure for the piston-cylinder units is hydraulic fluid supplied from a pump, the exhaust outlets 168 of the valves will be returned to the hydraulic fluid reservoir of the pump.

Retraction of the piston rods of the piston-cylinder units, upon communication of the cylinders with exhaust, is achieved by applying a resilient force to the right hand end of the group, with the unit at the left end of the group being secured against longitudinal displacement by abutment against the upward extension of the secondary frame member 146. In the embodiment illustrated, this resilient force is provided by the second rack member 170 whose teeth engage the pinion 144 diametrically opposite the first rack member 142. The outer end of the second rack member engages one end of a coil spring 172 the opposite end of which abuts the support section 14. This spring thus urges the inner end of the second rack member resiliently into operative abutment with the projecting end of the piston rod 154 of the piston-cylinder unit located at the right end of the group.

In the embodiment illustrated, locking means 174 is interposed between the inner end of the second rack member 170 and the adjacent piston rod 154, to provide for preselection of a subsequent fractional setting of a load during movement of the load to a previously selected set point. The locking means illustrated diagrammatically in FIG. 1 is shown in detail in FIGS. 3, 4 and 5.

Thus, the locking means includes a main body 176. Integral with or otherwise secured firmly to the bottom side of the body is a downwardly projecting clamp section 178 of T-shaped cross section. The projecting arms of this section are received slidably in the channels of a pair of laterally spaced channel members 180 which form the secondary frame member 146 illustrated in FIG. 1. The way 148 illustrated in FIG. 1 forms a second clamping member 182 of I-shaped cross section which also is confined between the lower legs of the spaced channel members 180 and is spaced from the T-shaped clamping member 178.

Extending freely through an opening in the body 176 and T-shaped clamping member 178 is a lock shaft 184. The lower end of this shaft abuts the I-shaped clamping member 182, and the upper end of the shaft projects into a groove 186 in the upper end of the body. Positioned in this groove and engaging the upper end of the shaft is an operating lever arm 188. This arm is secured pivotally to the body by means of the pivot pin 190 located closely adjacent the shaft and retained in the body by the spaced set screws 192.

The opposite end of the lever arm is connected to the upper end of the piston rod, 194 by the screw 196. The opening 198 in the lever arm for the connecting screw is enlarged to permit a degree of relative movement, and the screw is retained against rotation and detachment from the piston rod, by such means as the keeper wire 200 which extends through aligned openings in the screw head and lever arm. The ends of the wire are bent over the arm to retain it in position.

The lower end of the piston rod 194 is secured to a piston 202 which is movable vertically in a cylindrical bore 204 provided in the body. This bore extends downwardly from the top of the body and terminated inwardly of the bottom end thereof. The upper end of the cylinder bore is closed by a cap 206 which is retained in the bore removably by the diametrically spaced pins 208.

Interposed between the cap and the piston is a coil spring 210 which functions to urge the piston downward, pivoting the lever arm 188 counterclockwise and driving the lock shaft 184 downward to bear with substantial force against the I-shaped clamping member 182 to clamp it firmly against the lower arms of the channel member 180. This substantial force reacts against the body 176 to drive it upward, thereby clamping the T-shaped clamping member 178 firmly against the upper arms of the channel members 180. This dual clamping action thus locks the body 176 firmly to the secondary frame member 146, preventing movement of the second rack member 170 but allow the piston-cylinder units to be readjusted to a new fractional set point. This preselection thus may be made while the device is holding the load at a previously selected set point.

Release of the locking means is achieved by closing the switch 212 to energize the solenoid 214 which, consequently, adjusts the valve 216 to admit fluid pressure through the flexible conduit 218 into the cylinder opening 220 below the piston 202. This drives the piston upward against the resistance of the coil spring 210 and releases the driving force on the locking shaft 184. The second rack member 170 thus moves toward the left (FIG. 1), under the force of the spring 172, thereby drawing the locking means and the group of piston-cylinder units together to establish the preselected set point.

During movement of the second rack member 170 toward the left, the counterclockwise rotation of the pinion 144 causes the main frame member 98 to move toward the right, thus displacing the stop lugs 102 toward the right, relative to the latch pin 96, a distance equal to the preselected fractional distance established by the piston-cylinder units.

The operation of the positioning device described hereinbefore is as follows: Let it be assumed that the components of the device are in the positions of adjustment illustrated in FIG. 1, and that it is desired to move the load 26 toward the left a distance of 1", namely the distance between the stop lug 102 engaging the latch pin 96 and the next adjacent stop lug to the left. The operator switches the movable brush 136 of the selector switch counterclockwise to the next adjacent contact, and then depresses the main control switch 138. An electric circuit thus is completed from supply line L-2 through the rectifier 140 and main control switch, thence through the selector switch and the corresponding fixed positioning contact 114 of the positioning switch, through the engaging brush 116 to the left of the spacer element 120, out through the fixed collector contact 110, through the coil of the relay 104 and through the normally closed contact C of the other relay 108 to the supply terminal L-1.

Activation of the relay 104 switches its associated contacts from the positions illustrated. Opening of the contact C breaks the electric circuit of the relay 108 to insure against its inadvertent activation. Closure of the contact B completes the electric circuit of the latch control solenoid 94, whereupon the drive rack member 84 is driven downward against the resistance of the retracting spring 90, rotating the pinion wire 78 and retracting the latch pin 96 from the stop lug 102.

During rotation of the pinion wire to retract the latch pin, the safety switch control finger 82 rotates to close the safety switch 106. An electric circuit thus is completed from the supply terminal L-1 through the closed contact B of the activated relay 104, thence through the closed safety switch and the closed contact A of the activated relay 104, through the coil of the valve solenoid 40 to supply line L-2.

Upon activation of the valve solenoid 40, the control valve is moved toward the left to the position at which the valve port 42 interconnects the conduit 36 and the exhaust conduit 44. Fluid pressure from the pump 28 thus is applied to the reduced area end of the piston through the conduit 34, the opposite end of the piston being in direct communication with the fluid reservoir 32. The piston 20 thus moves toward the left, drawing with it the load 26, the latch assembly and the electrically non-conductive spacer element 120 which separates the two brushes 116 and 118 of the positioning switch.

The latch pin 96 moves to the left toward the next adjacent stop lug 102, whereupon the spacer element 120 engages the fixed positioning contact 114 to which the selector switch brush 136 is connected, thereby breaking the electric circuit of the relay coil 104. The associated contacts thus return to the positions illustrated, deenergizing the latch control solenoid 94 and the valve solenoid 40. Upon deactivation of the latch control solenoid, the rack member 84 is retracted by the spring 90, opening the safety switch 106 and extending the latch pin 96. Upon deactivation of the valve solenoid 40 the valve returns to the neutral position illustrated.

Because of the time delay inherent in the operation of the solenoid valve 38, the latch pin moves to the left beyond the stop lug 102.

With fluid pressure still being applied to the reduced area end of the piston through conduit 34 and the opposite, larger area end of the piston being sealed from the exhaust conduit 44, fluid pressure from the pump bleeds slowly through the bleed valve 52. As the fluid pressure thus applied to the larger area end of the piston builds to a magnitude exceeding one-half the pressure applied to the reduced end of the piston (assuming the larger area end to be twice that of the reduced area end), the piston is caused to move toward the right. The extended latch pin 96 thus is moved toward the right into engagement with the stop lug and, upon further movement toward the right the frame member 98 also is caused to move toward the right. Since the fractional piston-cylinder units are fixed in position, the pinion 144 is locked against rotation. Consequently, movement of the frame member 98 toward the right effects simultaneous movement of the secondary frame member 146 toward the right against the resistance of the springs 150 and 172.

As the secondary frame member 146 moves toward the right, it allows the relief ball valve 56 to open. Accordingly, fluid pressure at the larger area end of the piston 20 is relieved through said ball valve and the conduit 62 to the fluid reservoir 32, until the fluid pressure forces on the opposite ends of the piston are equalized.

It will be apparent, under the foregoing conditions, that since the secondary frame member 146 is locked to the main frame member 98 through the non-rotating pinion 144, the operating rod 64 of the relief ball valve is operatively engaged by the main frame member 98 which thus controls the operation of the relief ball valve.

It would appear under the foregoing conditions that the piston 20 would oscillate slightly across the desired set point, by alternate opening and closing of the relief ball valve. However, it has been found that this valve becomes stabilized in a minutely opened condition at the set point, to maintain the forces equalized at opposite ends of the piston. This is evident from the fact that no measurable or otherwise detectable movement of the load 26 occurs at the set point.

Let it now be assumed that it is desired to move the load 2" toward the right from the set point just established. The selector switch brush 136 is moved clockwise to the contact next adjacent the brush position illustrated in FIG. 1. Upon closing the main control switch 138, an electric circuit is completed from supply terminal L-2 through the rectifier 140 and main control switch, thence through the selector switch and the associated fixed positioning contact 114 of the positioning switch, thence through the brush strip 118 to the right of the spacer element 120, out through the collector contact 112, through the coil of the relay 108, thence through the normally closed contact C of the other relay 104 to supply terminal L-1. Upon activation of the relay 108, its contacts switch from the positions illustrated. Opening of the normally closed contact C breaks the electric circuit of the other relay 104 to insure against its inadvertent actuation, and closure of the contact B completes the electric circuit of the latch control solenoid 94. Activation of this solenoid effects retraction of the latch pin 96 and closure of the safety switch 106, as explained hereinbefore. An electric circuit also is completed from supply terminal L-1 through the closed relay contact B and the safety switch 106, thence through the closed contact A and the coil of valve solenoid 46 to the supply terminal L-2.

Activation of the valve solenoid 46 effects movement of the valve to the position at which the vertical port 48 interconnects the pump outlet and the conduit 36 leading to the end of the cylinder facing the larger area end of the piston 20. Although the fluid pressure applied against both ends of the piston is the same, its reaction against the larger area end is greater than the opposing reaction at the reduced area end. The piston thus moves toward the right, moving with it the load 26, the latch block 76 and retracted latch pin 96, and the pair of brushes 116 and 118 of the positioning switch.

Before the latch pin 96 reaches the position of the stop lug 102 to the right of the stop lug engaged by the latch pin in FIG. 1, the spacer element 120 engages the corresponding fixed positioning contact 114, breaking the electric circuits of the latch control solenoid 94 and the valve solenoid 46. The latch pin thus is extended, the safety switch 106 is opened and the valve 38 is returned to the neutral position illustrated. The latch pin thus is stopped a short distance to the left of the stop lug defining the desired end point. The length of the spacer element 120 is chosen to accommodate the time delay involved in operation of the solenoid valve 38.

With the larger area end of the piston blocked from both the pump outlet and the exhaust conduit 44, fluid pressure continues to be supplied through conduit 34 to the end of the cylinder facing the reduced area end of the piston. This fluid pressure bleeds slowly through the bleed valve 52, ultimately reaching a magnitude at which its force on the larger area end of the piston exceeds the force on the reduced area end of the piston. The piston thus continues to move toward the right until the latch pin 96 engages the stop lug 102 and then moves the frame member 98 toward the right to open the relief ball valve 56 and stop the load at the desired end point, as previously explained.

Let it now be assumed that while the positioning device was operating to hold the load at the desired end point, the operator determined that the next subsequent end point was to be ¼" farther to the right. Preselection of this next end point is made by closing the switch 166 in the electric circuit of the solenoid 164 controlling the valve 162 of the piston-cylinder unit third from the left in the group. The valve thus is moved to communicate the associated cylinder 156 with the exhaust outlet 168. Then, when it is desired to release the load from the preceding set point, the operator closes the switch 212 in the electric circuit of the solenoid 214 controlling the valve 216 associated with the locking mechanism 174. Fluid pressure thus is applied to the bottom end of the piston 202, moving it upward and releasing the clamp members 178 and 182. The spring 172 then forces the second rack member 170, the locking mechanism 174, the right hand piston-cylinder unit and the piston 152 of the exhausted cylinder 156 toward the left a distance of ¼". The pinion 144 thus is caused to rotate counterclockwise, moving the main frame 98 toward the right ¼". This displaced the latch pin 98 and stop lug 102 by the same distance.

During this movement, the secondary frame member 146 closes the relief ball valve 56, thereby allowing fluid pressure again to build up in the cylinder 18 on the larger area end of the piston 20, by bleeding through the bleed valve 52. The piston thus moves toward the right until the latch pin 96 engages the stop lug 102 and moves the main frame toward the right to operate the relief ball valve 56 to equalize the forces on the opposite sides of the piston, as previously explained.

The device of the present invention may be designed to provide movement of a load 26 to predetermined set points in one direction only. In such event, one of the pair of brushes 116 and 118 of the positioning switch may be omitted since there would be no requirement for sensing the direction of desired movement.

In the event the device is designed for positioning a load selectively at increments represented only by the stop lugs 102, the assembly of the secondary frame member 146, racks 142 and 170, pinion 144 and the piston-cylinder units, may be omitted. In such event the main frame member 98 will be positioned for engagement with the operating rod 64 of the relief ball valve 56, and it will be biased resiliently toward said rod by such means as a coil spring arranged in manner similarly to the coil spring 150.

It will be apparent that since the arm 66 functions primarily to connect the load to the latch block 76 for positioning control of the load, the drive unit piston 20 or cylinder 18 may be connected to the load in various ways other than as illustrated. If the cylinder is connected to the load and the piston is fixed to the support, the fluid pressure conduits 34, 36 may be provided as flexible hoses.

The operating range of the device may be extended to any length desired by appropriate dimensioning of the cylinder 18, frame member 98, poistioning switch and related components.

The stop lugs 102 may be replaced by a single stop lug which is movable along the frame member 98, by such means as a micrometer screw, to positions to which a load is desired to be set.

The foregoing and various other changes in size, shape and arrangement of parts may be made without departing from the spirit of this invention and the scope of the appended claims.

Having now described my invention and the manner in which is may be used, what I claim as new and desire to secure by Letters Patent is:

1. A load positioning device comprising
    (a) a support,
    (b) a fluid pressure drive unit including relatively movable piston and cylinder members, one of said members being fixed relative to the support,
    (c) a piston rod on the piston extending outward through the cylinder,
    (d) a source of fluid pressure,
    (e) first conduit means communicating the source of fluid pressure with the cylinder at one end of the piston,
    (f) second conduit means communicating at one end with the source of fluid pressure and at the opposite end with the cylinder at the opposite end of the piston,
    (g) drive control valve means in the second conduit means for selectively communicating said opposite end of the piston with the source of fluid pressure and with exhaust,
    (h) bleed valve means communicating the opposite ends of the piston with each other,
    (i) third conduit means communicating said opposite end of the piston with exhaust,
    (j) relief valve means in the third conduit means for releasably sealing the latter,
    (k) releasable latch means secured to the movable member of the drive unit for movement therewith,
    (l) a frame member mounted on the support for movement parallel to the movement of the latch means,
    (m) stop means on the frame member identifying positions to which a load is to be set and arranged for releasable engagement by the latch means,
    (n) abutment means movable by the frame member and arranged to engage the relief valve means for operating the latter, and
    (o) operator means for the drive control valve means and latch means.

2. The load positioning device of claim 1 wherein
    (a) the operator means for the latch means and drive control valve means comprise a pair of electrical actuator means each having an electric circuit,
    (b) control switch means in the electric circuits of the actuator means for the latch means and drive control valve means,
    (c) electrical actuator means for the control switch means and having an electric circuit,
    (d) pcsitioning switch means in the last named electric circuit and having a plurality of electrical positioning contacts each associated with a different position of the stop means,
    (e) electrically conductive brush means movable with the latch means and arranged for selective engagement with the positioning contacts,
    (f) selector switch means releasably connecting each positioning contact selectively to the electric circuit of the control switch actuator means, and
    (g) conductor means connecting the brush means to said electric circuit.

3. The load positioning device of claim 1 wherein the stop means comprises a plurality of stop members on the frame member spaced apart in the direction of movement of the latter.

4. The load positioning device of claim 3 wherein
    (a) the abutment means comprises a secondary frame member supported for movement relative to the support,
    (b) resilient means interengaging the support and secondary frame member and urging the latter in the direction to close the relief valve means, (c) a plurality of fluid pressure piston-cylinder units mounted on the secondary frame member with the piston of each unit projecting from its cylinder and abutting the cylinder of the next adjacent unit, the unit at one end being fixed against movement relative to the secondary frame member and the remaining units being movable relative to the secondary frame member, the relative movement between the piston and cylinder of each unit being of different magnitude to provide fractional settings between adjacent stop members on the main frame member, (d) a first rack member operatively engaging at one end the piston-cylinder unit opposite the fixed unit, (e) resilient means interengaging the support and the opposite end of the first rack member, (f) a second rack member on the main frame member, (g) a pinion on the secondary frame interengaging the first and second rack members, and (h) control valve means communicating each piston-cylinder unit selectively with a source of fluid pressure and exhaust.

5. The load positioning device of claim 3 wherein (a) the operator means for the latch means comprises an electrical actuator means having an electric circuit, (b) the operator means for the drive control valve means comprises a pair of electrical actuator means each having an electric circuit, (c) control switch means in the electric circuits of the actuator means for the drive control valve means, (d) electrical actuator means for each control switch means and each having an electric circuit, (e) positioning switch means in the last named electric circuits and having a plurality of electrical positioning contacts each associated with a different one of the stop members, (f) a pair of electrically conductive brush means movable with the latch means and arranged for selective engagement with the positioning contacts, (g) selector switch means releasably connecting each positioning contact selectively to a common portion of both electric circuits of the control switch actuator means, (h) conductor means connecting each brush means to a different one of said electric circuits, and (i) latch actuator control switch means in the electric circuit of the latch actuator means and operable selectively by the drive control actuator means.

6. The load positioning device of claim 5 including safety switch means in the electric circuits of the actuator means for the drive control valve means and operable by the actuator means for the latch means.

7. The load positioning device of claim 5 wherein the pair of brush means comprise an endless band mounted on spaced rollers and including a pair of electrically conductive strips interconnected at their opposite ends by electrically non-conductive spacer members, and connector means interconnects the band and the latch means for simultaneous movement.

8. The load positioning device of claim 5 wherein (a) the abutment means comprises a secondary frame member supported for movement relative to the support, (b) resilient means interengaging the support and secondary frame member and urging the latter in the direction to close the relief valve means, (c) a plurality of fluid pressure piston-cylinder units mounted on the secondary frame member with the piston of each unit projecting from its cylinder and abutting the cylinder of the next adjacent unit, the unit at one end being fixed against movement relative to the secondary frame member and the remaining units being movable relative to the secondary frame member, the relative movement between the piston and cylinder of each unit being of different magnitude to provide fractional settings between adjacent stop members on the main frame member, (d) a first rack member operatively engaging at one end the piston-cylinder unit opposite the fixed unit, (e) resilient means interengaging the support and the opposite end of the first rack member, (f) a second rack member on the main frame member, (g) a pinion on the secondary frame interengaging the first and second rack members, and (h) control valve means communicating each piston-cylinder unit selectively with a source of fluid pressure and exhaust.

9. The load positioning device of claim 8 including lock means interposed between the first rack member and adjacent piston-cylinder unit and releasably engaging the secondary frame member for securing said rack member releasably against movement relative to the secondary frame member.

10. The load positioning device of claim 9 wherein the lock means comprises a piston-cylinder unit mounted slidably on the secondary frame member, movable clamp means releasably interengaging the cylinder and secondary frame member, lever means on the cylinder engaging the clamp means and operable by the piston of the unit, and control valve means communicating the cylinder of the unit selectively with a source of fluid pressure and exhaust.

References Cited

UNITED STATES PATENTS

| | | | |
|---|---|---|---|
| 2,821,172 | 1/1958 | Randall | 91—42 |
| 2,860,751 | 11/1958 | Seigle | 91—42 |
| 2,991,758 | 7/1961 | Pfau | 91—417 |
| 3,095,785 | 7/1963 | Cahill | 91—42 |
| 3,198,084 | 8/1965 | Hague et al. | 91—416 |

EDGAR W. GEOGHEGAN, *Primary Examiner.*

B. L. ADAMS, *Assistant Examiner.*